July 7, 1931.　　　A. H. SHOEMAKER　　　1,813,431

DEMOUNTABLE WHEEL AND HUB

Filed July 3, 1928

INVENTOR
Alvin H. Shoemaker
BY
Fred C. Matheny
ATTORNEY

Patented July 7, 1931

1,813,431

UNITED STATES PATENT OFFICE

ALVIN H. SHOEMAKER, OF SEATTLE, WASHINGTON

DEMOUNTABLE WHEEL AND HUB

Application filed July 3, 1928. Serial No. 290,064.

My invention relates to improvements in metal disc wheels and hubs of the type in which the wheel is demountable from the hub and my present invention is in the nature of an improvement on the respective metal disc wheels disclosed in my two copending applications Serial Number 135,073, filed September 13, 1926, which has matured into Patent No. 1,676,874; and Serial Number 259,167 filed March 5, 1928.

The general objects of my present invention are to improve and simplify and increase the efficiency of wheels of this type.

A more specific object is to provide an improved hub structure in which the wheel is rigidly and immovably secured upon a tapered hub block of other than circular shape by means including the hub cap nut, said wheel being quickly and easily demountable by removing the hub cap nut.

Another specific object is to provide an improved rim structure in which the edges whereon the tire beads rest are reinforced by rings or hoops of resilient wire thus adding strength and durability to the wheel and making possible the use of lighter material in the construction of the wheel.

Other and more specific objects will be apparent from the following description taken in connection with the accompanying drawings.

In the drawings Figure 1 is a side elevation of my wheel.

Like reference numerals designate like parts throughout the drawings.

Figure 1:
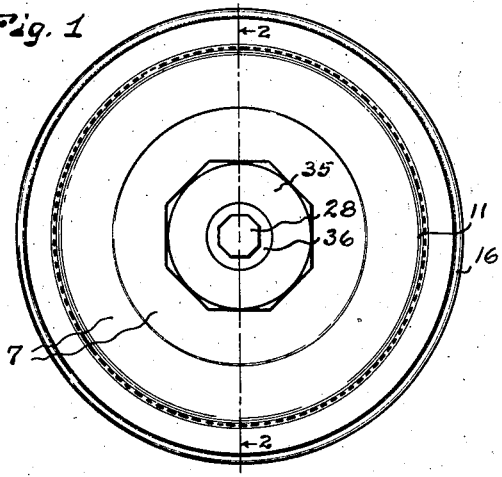
Figure 3:
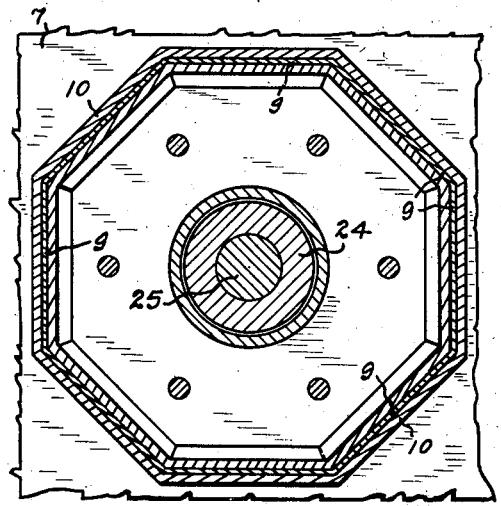
Fig. 3 is a fragmentary cross section on line 3—3 of Fig. 2.
Figure 2:
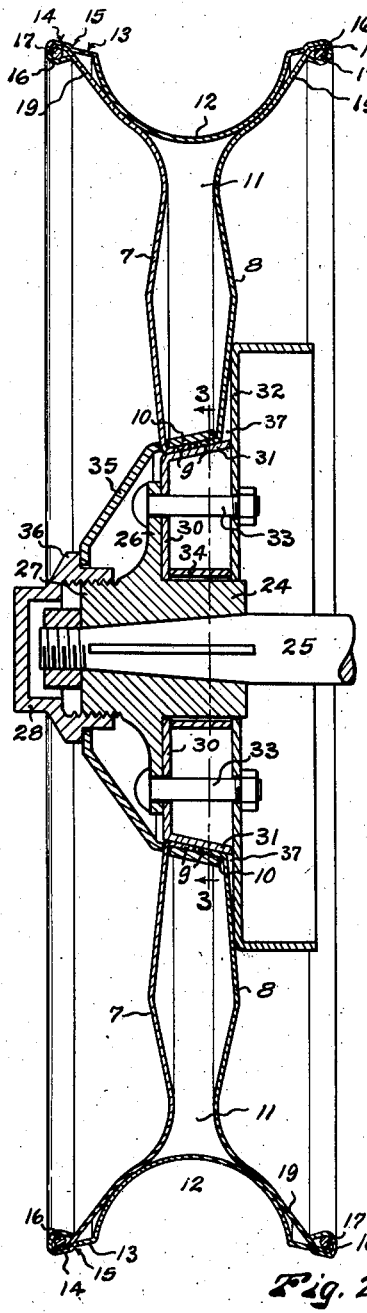
Fig. 2 is a cross section of the wheel on a larger scale on line 2—2 of Fig. 1.

The drawings show a wheel composed of two spaced apart sheet metal discs 7 and 8 formed with open centers and having their inner edges 9, around said open centers, bent into and clinched within a tapered band 10. The discs extend outwardly from the band 10 in spaced apart divergent relation for a short distance and thence converge toward each other but do not necessarily come entirely together at the annular location 11 just inside the rim. From the position 11 said discs diverge at a sharp angle and form a cradle for a recessed rim 12 of approximately semicircular cross sectional shape. Both edges of the rim 12 are bent sharply outward to form an inner cone 13 and an outer cone 14 between which is a shallow step or shoulder 15. The outer edges of the cone portions 14 are clinched as at 16 inwardly around reinforcing rings 17 of heavy wire and the extremities 18 of the outwardly flanged portions 19 of the wheel discs are caught and firmly secured within the clinches 16. The flange portions 19 may be in actual contact with the rim 12 for any desired distance. This structure, including the discs 7 and 8 with flanged peripheries 19 supporting the recessed rim 12 which is clinched over the reinforcing rings 17 forms a very strong and substantial and yet a very flexible rim structure which is light in weight and may be made of relatively thin sheet metal.

The hub structure for demountably supporting the wheel embodies a hub member 24 secured to a live axle 25 and having a flange 26 and an externally threaded outer end 27 for the reception of an internally threaded hub cap nut 28. A plate 30 is provided with an octagonal tapered or inclined periphery 31 for the reception of the octagonal center of the wheel. The plate 30 and tapered portions 31 thus constitute an externally tapered hub block for the reception of the wheel. The plate 30 is secured to the hub flange 26 and to a brake drum 32 by bolts 33, a spacing ring 34 is interposed between the plate 30 and the brake drum 32 adjacent the hub 24. A thrust cone 35 is provided for demountably securing the wheel onto the hub structure. A central opening in the thrust cone fits over the hub nut 28 and is engaged by a flange 36 on said hub nut and the marginal portion of said thrust cone is of octagonal shape to conform to the shape of the band 10 and is adapted to be pressed against the outside of the wheel opposite the end of the band 10.

Figure 4:
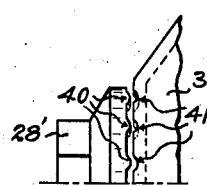
Fig. 4 is a fragmentary elevation of a self locking hub nut and thrust plate.

Tightening the hub nut 28 against the thrust cone 35 forces the band 10 very tightly onto the inclined octagonal periphery 31 of the plate 30 thus securing the wheel rigidly and immovably to the hub. The resiliency of the thrust plate 35 will ordinarily prevent loosening of the hub nut 28, but, as an additional precaution against the loosening of said hub nut I may provide the locking means shown in Fig. 4, in which a hub nut 28' and a thrust plate 35' are provided with rounded projections 40 and depressions 41 respectively which interfit and positively prevent loosening of the hub nut. The interfitting tapered portions are shown octagonal but may be made of any shape except a true circle, the object of this shape being to prevent relative rotation or creeping movement between the hub structure and the wheel. I find that where a taper is not used there is a tendency for the wheel to become loose even though a very accurate fit is made. The taper is essential to prevent this looseness and play between the hub structure and the wheel. I find a taper of ten to fifteen degrees to be suitable for this purpose but any taper may be used.

When the wheel is placed on the hub structure the edges 9 of the side plates 7 and 8 which are bent within the bands 10 are very tightly clamped and are held immovable thus contributing to the production of a strong wheel. The wheel disc 8 may rest against the back of the brake drum near the margin of said drum so that the drum serves as a reinforcing means for the wheel. Enough clearance is allowed back of the band 10, as indicated at 37, to compensate for wear and variation in sizes and to permit the wheel always to be forced tightly onto the tapered portions 31.

Obviously changes may be made within the scope and spirit of the following claims.

I claim:

1. A wheel and hub structure embodying a hub member secured to an axle and having a flange thereon, a plate seating against said flange, the margin of said plate being bent inwardly to form a polygonal hub block which tapers convergently toward the outside of said wheel, a brake drum disposed with its rear side against the inner side of said hub block, spacing means between said plate and said brake drum adjacent said hub member, bolts securing said plate and said brake drum together, a wheel having a tapered polygonal hub opening adapted to fit tightly onto said tapered hub block, a thrust cone engaging the wheel around the hub opening and means for forcing the thrust cone against the wheel.

2. A wheel and hub structure embodying a hub member secured to an axle and having a flange thereon, a plate resting against said flange, polygonal wheel receiving means extending inwardly from the margin of said plate and inclined at other than right angles relative to the plate, a brake drum disposed with its rear side against the tip of said wheel receiving means, bolts securing said plate and said brake drum together, a wheel having a tapered polygonal hub opening adapted to fit tightly onto said wheel receiving means, and devices for securing said wheel on said wheel receiving means.

ALVIN H. SHOEMAKER